Aug. 12, 1969  W. E. MARTIN  3,460,279
EARTH WORKING SCRAPER ATTACHMENT FOR FARM TRACTORS
Filed March 7, 1966  3 Sheets-Sheet 1
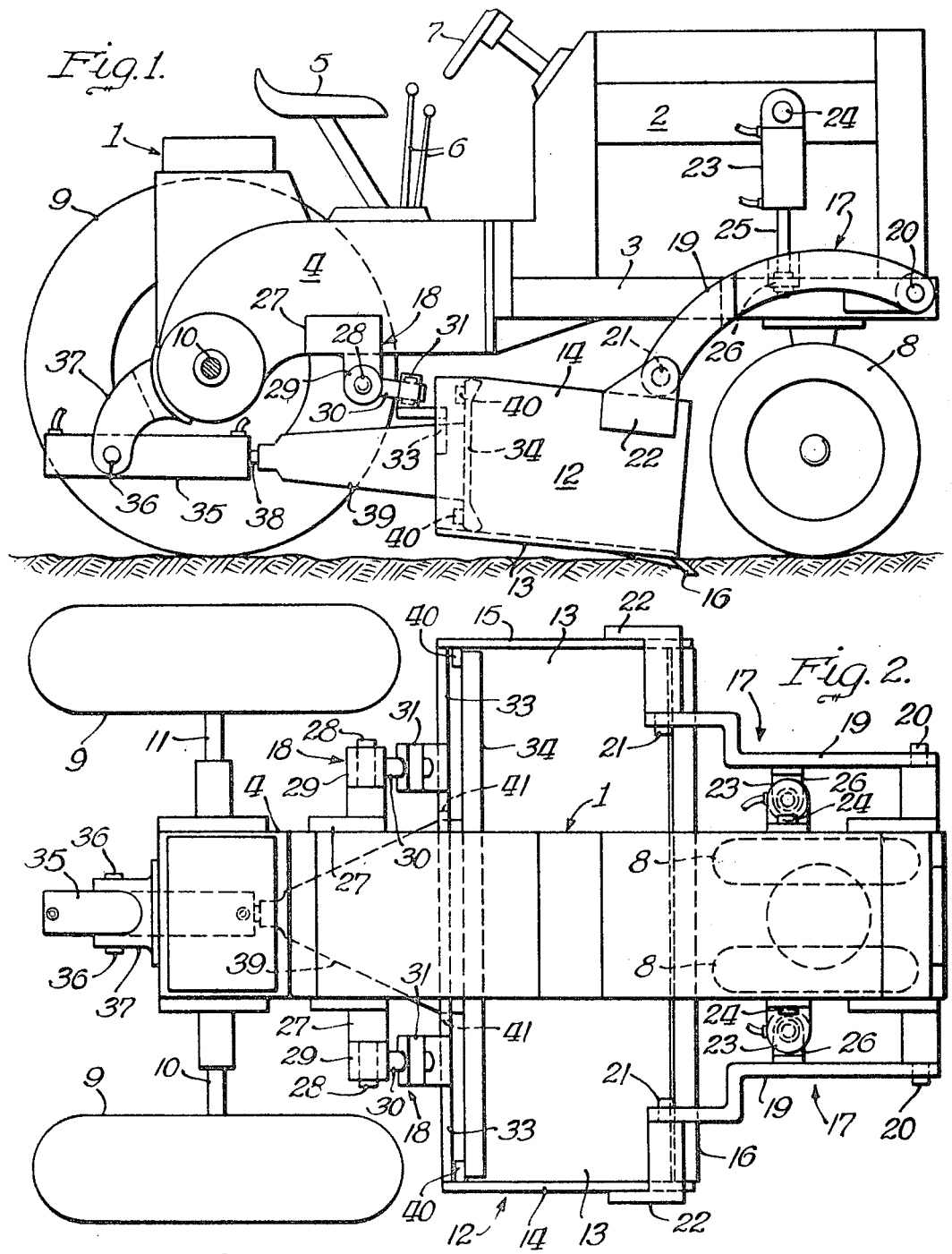
INVENTOR:
William E. Martin
BY
Eberhard E. Wulley
Atty.

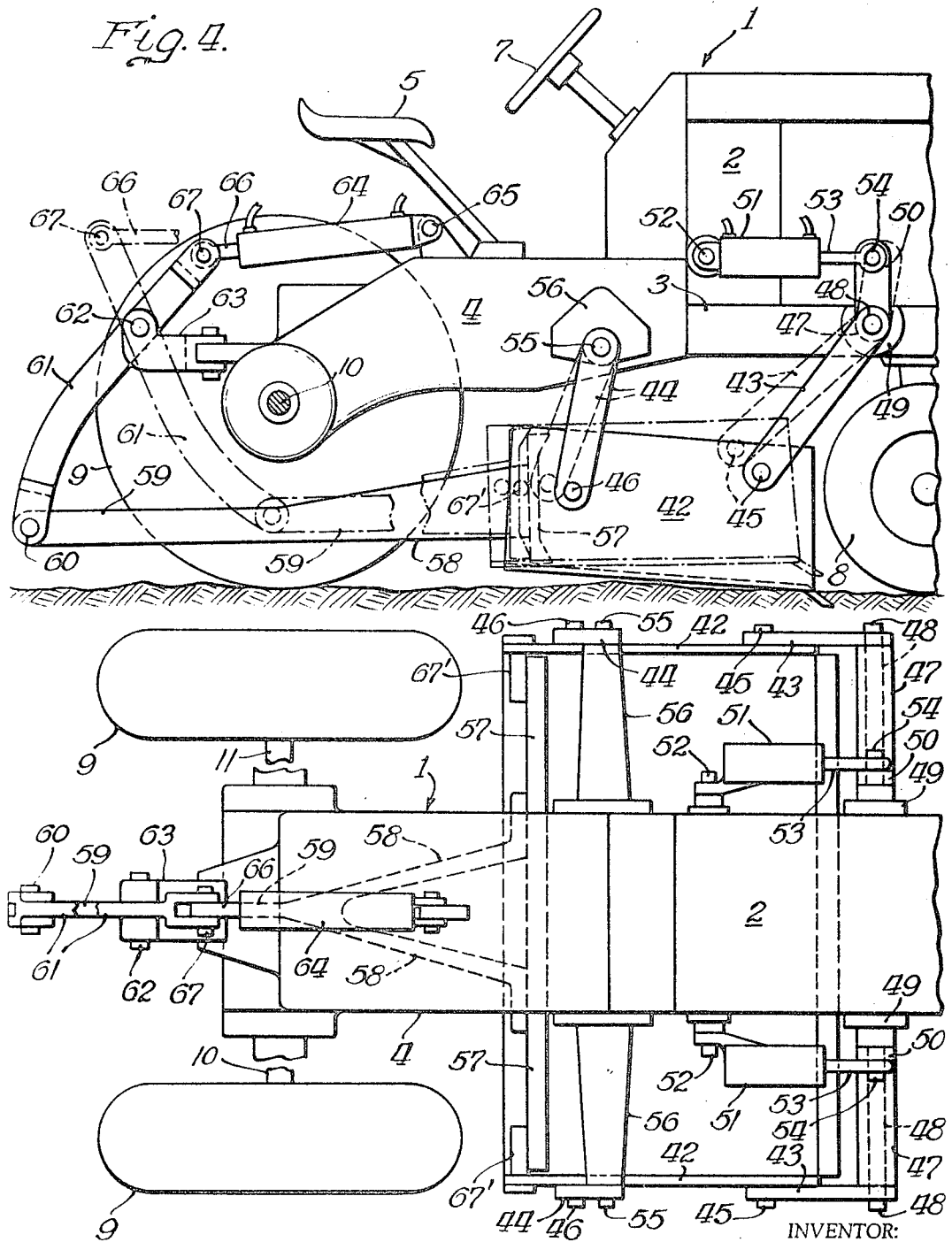

Aug. 12, 1969 W. E. MARTIN 3,460,279
EARTH WORKING SCRAPER ATTACHMENT FOR FARM TRACTORS
Filed March 7, 1966 3 Sheets-Sheet 3
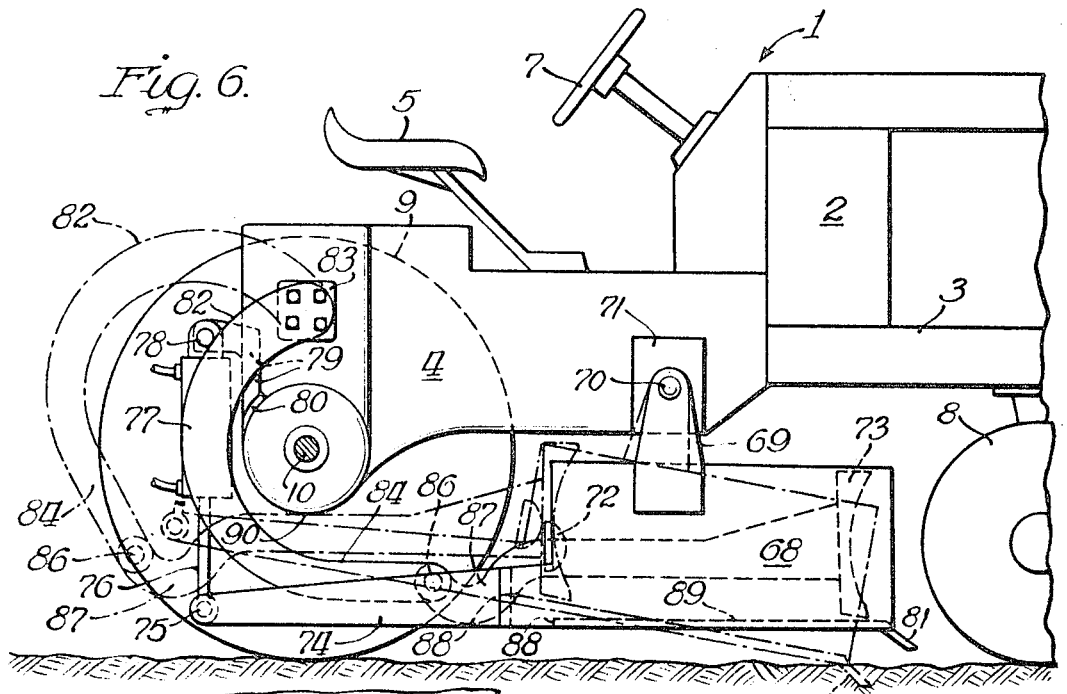
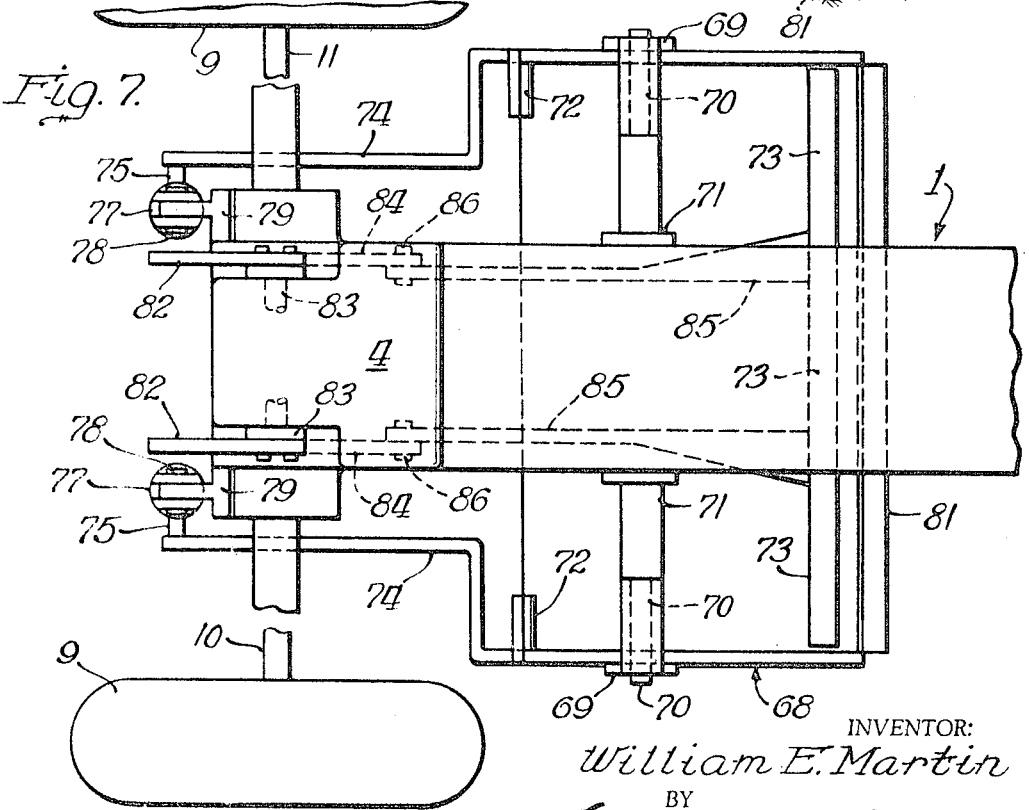
INVENTOR:
William E. Martin
BY
Eberhard E. Wetter
Atty.

United States Patent Office 3,460,279
Patented Aug. 12, 1969

3,460,279
EARTH WORKING SCRAPER ATTACHMENT
FOR FARM TRACTORS
William E. Martin, % The Martin Company,
P.O. Box 187, Kewanee, Ill. 61443
Filed Mar. 7, 1966, Ser. No. 532,255
Int. Cl. E02f 3/62
U.S. Cl. 37—126                                    10 Claims

ABSTRACT OF THE DISCLOSURE

An earth working scraper attachment for farm tractors or the like comprising a scraper bowl for placement between the front and rear tractor wheels, first and second suspension means, power means to position said bowl, ejector. The ejector manipulating means comprises structure extending beneath and past the rear axle of the tractor.

This invention relates to a scraper assembly that is adapted for attachment to a conventional farm tractor and which includes power operated working mechanisms to regulate and to control the activities of such a scraper to perform the necessary and normal working functions of such a scraper assembly.

More specifically, the invention provides a scraper for road working or for other earth moving purposes which is devised and arranged for attachment with a farm tractor through designed operative suspension means to control the movements and functions of the scraper bowl including certain power mechanisms having hydraulic cylinders that receive their fluid pressure from the tractor fluid pressure supply from the tractor fluid pressure source through suitable valve controlled supply lines to be regulated by the tractor operator whereby to manipulate the movements and workings of the scraper bowl.

It is one of the objects of the present invention to provide a scraper bowl having suspension attachment apparatus arranged for releasable connection with a farm tractor and to further provide certain power operated hydraulic means interposed between the farm tractor and the scraper bowl assembly to enable a tractor owner to convert his tractor to an earth moving facility under the power available from and supplied by a tractor.

It is another object to provide a road working scraper having a bowl to carry the material being handled or moved and to provide an ejector means slidably seated in said scraper bowl for material ejection from said bowl and wherein said ejector includes hydraulically actuated mechanism releasably mounted upon the farm tractor to control the ejector motion lengthwise of the bowl and to regulate the normal working and static positions of the ejector according to the manipulations of the operator to carry out the scraper functions necessary for a given job.

Another object is to introduce certain push and pull arrangements that are releasably carried on the farm tractor to operate the material ejector and which aforesaid assemblies are made to adjust to the raising and lowering of the bowl between lowered bowl loading positions and raised bowl material carrying positions including any selected bowl material ejection positions.

A further object is to introduce cooperative mechanisms that are independently workable to regulate and control the scraper bowl and to regulate and control the scraper bowl ejector blade, including certain blade stop units to prevent blade separation from within the scraper bowl under normal operation. In this connection it should be noted that the ejection mechanism can be readily disassembled from the bowl and its associated mechanism to aid in the attachment with or disassembly from a tractor.

A still further object is to provide a resilient coupling means in some of the bowl support and control apparatus to allow a given lateral tilt by the bowl through regulation by other of the bowl suspension mechanisms for angular surfacing or grading by the bowl.

Some other objects relate to the scraper bowl suspension link means and brackets wherein a drawbar link is used in one case to support the bowl, dual links are used in another case with one link acting in drawbar fashion and in still another form a single pivoted depending bracket arrangement is used to swing the bowl about a fixed lateral axis relative to the tractor.

Another object is to provide a scraper bowl for suspension and manipulation beneath the tractor and in the space between the front and back wheels providing various adjustable support mechanisms connected at different locations with the bowl proper and for pulling the bowl under the tractor and the added apparatus to manipulate the bowl material ejector which latter apparatus is depicted as carried under the rear wheel axle of the tractor and operable from that position or by actuation means disposed beneath or over the rear wheel axle. The actuation means may be a power cylinder or it may be means actuated or operated directly from a power takeoff drive means of the tractor per se.

All other objects and advantages of the present invention shall hereinafter appear in or become evident from the following detailed description having reference to the accompanying drawings forming a part of this specification.

In the drawings:

FIG. 1 is a general diagrammatic side elevational view of the right side of a farm tractor with the near side rear wheel omitted and illustrating one form of the earth moving scraper of the present invention with the scraper bowl shown in a lowered operative earth working position;

FIG. 2 is a plan view of the tractor-scraper assembly shown in FIG. 1 with certain tractor details such as the seat, shift levers and steering wheel being omitted for the sake of clarity, this same procedure being followed in the susbsequent plan view illustrations to be described;

FIG. 3 is a detailed cross sectional view in vertical longitudinal section of one of the rear support coupling means that holds the scraper bowl to the tractor body;

FIG. 4 is a general diagrammatic side elevational view of the right side of a farm tractor illustrating a modified attachable road scraper which is shown in a downward working position in full lines and in a raised position in broken lines;

FIG. 5 is a plan view of the tractor-scraper combination shown in FIG. 4;

FIG. 6 is another general diagrammatic side elevational view of the right side of a farm tractor embodying still another modified ararngement of an earth moving scraper and in this view the scraper bowl is shown in a raised inoperative or transport position in full lines and in a lowered operative ground engaging and working position in broken lines; and FIG. 7 is a plan view of the farm tractor-scraper combination shown in FIG. 6 with the tractor again being simplified to better illustrate the details of the invention.

Referring to the drawings and to FIGS. 1 to 3, this arrangement shows a farm tractor 1 of a conventional or standard type including the engine structure 2, frame 3, transmission and power takeoff housing 4, seat 5, control levers 6, steering wheel 7, front steerable wheels 8 and the rear wheels 9 with drive axles 10 and 11 for the two wheels 9.

The attachable scraper assembly comprises a bowl 12 having a bottom wall 13, side walls 14 and 15 and a forward or front edge cutting blade 16. The bowl 12 rides under the tractor between the front and rear wheels on fore and aft suspension means 17 and 18 respectively. Suspension means 17 comprises a draft bar link 19 carried on a pivotal support shaft 20 bracket attached to the tractor and with link 19 extending rearwardly for pivotal connection with shaft 21 on a bracket 22 on the bowl wall 14. The same construction exists on both sides of the scraper bowl assembly so that the same reference numerals will be generally used for like complementary parts to simplify the description and explanation.

The draft bar link 19 is raised and lowered by means of a double acting hydraulic cylinder 23 that swings on a stub shaft 24 suitably secured to the tractor or carried on the side of the engine structure 2, with the cylinder rod 25 connected with a bracket 26 mounted intermediate the length of the draft link 19. By activating the cylinder 23 to raise or lower draft link 19 on its pivot 20, the bowl 12 is raised or lowered with the rear end of link 19 for moving the bowl between operative and inoperative or transport positions as regulated by suitable valving means and connections (not shown) with cylinder 23 from the tractor hydraulic pressure system.

The suspension means 18 is a swingable support having limited resiliency in its coupling member that connects with the scraper bowl 12. The means 18 comprises a bracket 27 on the tractor having a lateral stub shaft 28 to rotatably carry the hub member 29 that provides a swingable support stem 30 that rides solidly in a coupling 31 shown in FIG. 3 as including a resilient molded rubber unit 32, the coupling 31 being secured to or forming a part of a cross brace 33 extending between and connected with the bowl side walls 14 and 15. There are two suspension means 18 as seen in FIG. 2 so that the laterally suspended bowl 12 can swing as a unit on the aligned pivotal shafts 28 with equal simultaneous operation of the cylinders 23, or the bowl may be laterally tilted under the tractor 1 if the cylinders 23 are unequally vertically operated by the operator to suspend the opposite outward sides of the bowl at different elevations.

The bowl 12 is provided with a material discharge blade or ejector 34 positioned transversely of the bowl and resting on the floor wall 13 while guided between the side walls 14 and 15 for movement fore and aft within the bowl. The ejector is actuated by means of a hydraulic cylinder 35 swingably supported on pins 36 on a bracket 37 that is releasably mounted on the tractor transmission housing 4 behind the axles 10 and 11. The piston rod 38 of cylinder 35 is secured to a frame unit 39 that forms a portion of the ejector means 34. The bowl also has one or more internal stops 40 to provide a suitable retraction limit means for the blade or ejector 34 under cylinder operation, although brace 33 could serve as a stop or the cylinder stroke could be limited to suit conditions of operation in certain cases if so desired. The cylinder stroke is used to control forward motion limit of the ejector 34.

It should be noted that the underside of the cross brace 33 is notched at 41 centrally thereof for clearance purposes to let the ejector frame unit 39 move under the brace while moving the ejector fore and aft in the bowl. Brace 33 also limits upward movement of the frame unit and the ejector in the present design, although the weight of the combined frame unit and ejector will normally serve to hold the material discharge means in place within the bowl to function as described.

With the bowl being independently controlled and manipulated by its independent suspension means and with the ejector having its own operative means to move it back and forth in the bowl while riding freely in such bowl, the ejector can readily follow the motions of the bowl and accommodate itself to the bowl positions even when the bowl is subjected to lateral tilt under the action of the forward suspension cylinders and draft links as was previously explained hereinbefore.

Referring now to the construction illustrated in FIGS. 4 and 5, this arrangement shows a farm tractor as before with the same reference numerals and a scraper bowl 42 is suspended beneath the tractor by lateral dual link sets each having links 43 and 44 pivoted on the bowl sides on support pins or shafts 45 and 46. Link 43 is both a support member and a draft member for the bowl and includes a sleeve 47 carried on a tractor support shaft 48 secured by bracket 49 to the tractor frame 3 and another arm or link 50 is secured or made a part of sleeve 47. A power cylinder 51 is swingably mounted on a shaft 52 mounted on the engine housing portion of the tractor and the cylinder ram 53 is pivotally connected with arm or link 50 by means of a pin or stub shaft 54, which completes the bowl raising and lowering mechanisms one at each side of the tractor, such mechanisms using links 43 as the draft members for the bowl 42.

Each link 44 is pivotally and freely swingably supported on stub shafts 55 on hanger brackets 56 secured to the farm tractor. By making link 44 shorter than link 43 and by disposing the links at different angular relations to each other as shown in broken lines in FIG. 1 with the bowl raised, it is possible to obtain a forward and downward pitch to the bowl in the longitudinal direction of the tractor or in the line of travel when placing the bowl in operative position. The rear bowl links are idlers so to speak but effective guide means in combination with the front links 43 that are the main control links as explained.

By reason of the limited clearance space under the tractor and between the front and rear wheels, link 44 achieves its bowl guiding support function with little vertical motion but with greater fore and aft motion while the link 43 attains more rapid vertical as well as horizonal displacement of the bowl under operation when considering the necessary bowl action under operation.

For bowl material clearance, an ejector 57 is seated in the bowl for sliding motion therethrough and a frame 58 is attached to the ejector which frame terminates with a push arm 59 pivotally joined by pin 60 with the lower end of the rocking link 61. An intermediate bearing pin 62 is supported by the bracket 63 to carry the link 61, while a power cylinder 64 is mounted at 65 on the tractor with its ram 66 connected by pin 67 with the upper end of link 61. Thus the ejector mechanism is disposed above and below the tractor axle while disposed and connected to the rear thereof to provide the clearances needed for providing the full stroke for the ejector 57 in bowl 42.

In this construction as in the first form described, the piston stroke of cylinder 64 is used to control or limit the travel of the sliding ejector 57 through the bowl 42. As a further stop means to limit ejector rectraction, stop pins 67' are shown carried by the two side walls of the bowl and in a position to receive the back wall of the ejector intermediate the height of the bowl to not only furnish stop means but to allow more or less vertical tilting or rocking contact by the ejector 57 in its function of adjusting to the various positions of the bowl.

In the scraper bowl attachment shown in FIGS. 6 and 7, the bowl 68 is suspended by bearing brackets 69 carried on aligned shafts 70 having mounting means 71 releasably connected with the tractor, such arrangement thus providing a swingable link-like suspension means to permit cradle rocking of the bowl per se about the axes of shafts 70. Bowl ejector stop members 72 are located on the side bowl walls to receive and to stop the ejector upon retraction and to allow the ejector 73 to adjust to the angular positions of bowl 68.

Each side wall of bowl 68 has a tilting arm extension 74 pivotally joined at 75 with ram 76 of a cylinder 77 that is swingably held on pin 78 of a bracket 79 attached at 80 with the tractor body or transmission unit 4. By operating cylinders 77, the bowl is fore and aft tilted by the extensions 74 to bring the cutting blade 81 into or out of ground contact during the operation of the bowl assembly.

The ejector operating means comprises two identical mechanisms each having a curved push and pull arm 82 secured to a suitable rotary power takeoff shaft 83 located above the tractor rear axle location with the arm having a terminal end 84 adapted for longitudinal displacement back and forth under the rear axle. Ejector frame members 85 are pin connected at 86 with the swingable ends 84 of the arms 82 to be moved by such arms. While the swinging action of the arms 82 is controlled by the operator through tractor means 83, the frames 85 are made to include a downward formation as at 87 both for clearance purposes and to act as stops by engaging the rear edge 88 of the bowl bottom 89. This limits forward motion of the ejector. Attention is also called to the fact that the ejector frames contact the underside of the axle portion of the tractor transmission as at 90 to stop the retractive swing of arm 82 and the retraction of the ejector at this point of operation of the bowl assembly. In this construction as in the others, the ejector and its operating means are easily adjusted to the functional motions of the bowl in its several working relationships and positions. And brackets 69 are the draft link members for the bowl as further stabilized by cylinders 77 acting on the wing arms 74 that extend rearwardly from the bowl as above described.

With the last form of the invention, the operational units are made to encircle and work about or to the rear of the tractor axle to cause operation of the bowl from above and to the rear and underneath the tractor in contrast to the first two described forms of the invention. It is the space problem that has led to the design described and to the particular mechanisms evolved to make the best use of the available space between the wheels and under a farm tractor of the general type illustrated.

The foregoing description relates to several preferred forms of the invention which forms are only disclosed by way of examples and not as limitations in practicing the structural concept of this invention. Changes are contemplated in the combinations submitted and in the individual elements of the combinations without departing from the inventive scope of this invention. The extent of such modifications or changes are only to be limited by the breadth and scope of the language contained in the following claimed subject matter directed to the scraper bowl assembly that is attachable to a farm tractor as hereinbefore shown and described.

What I claim is:

1. In an earth working vehicle of the type having a rigid frame including front and rear wheeled axles, a scraper assembly comprising a scraper bowl beneath the frame between the axles and having a forward cutting edge over which earth is loaded and unloaded; means interconnecting the bowl and the vehicle to transmit forward movement of the vehicle into forward movement of the bowl; suspension means connected with the bowl and swingably mounted on the vehicle for movably mounting the bowl between lowered earth receiving and raised earth carrying positions; power means operatively connected between the vehicle and the bowl to raise and lower the forward bowl end; a material ejector supported in the bowl for reciprocable movement therethrough; and ejector thrust transmitting means interconnected between the vehicle and the ejector for imparting forward ejecting movement to the ejector, the ejector thrust transmitting means comprising a fulcrum connected to the rigid frame; a frame structure secured to the ejector and extending rearwardly therefrom; force applying structure pivotally carried by the fulcrum and operatively connected to the frame structure; one of the structures extending beneath and past the rear axle.

2. In the combination of claim 1 wherein said means interconnecting the bowl and the vehicle comprise dual mechanisms supported at each side of the vehicle and connected at laterally spaced locations on said bowl and said suspension means include a coupling flexible between predetermined limits to permit lateral bowl tilting of the front end of said bowl.

3. In the structure set forth and claimed in claim 1 wherein said ejector is operable between given fore and aft limits along the length of the bowl and wherein stop means are connected with the bowl to limit the maximum motion of said ejector rearwardly through the bowl.

4. In the structure set forth and defined in claim 1 wherein said means interconnecting the bowl and the vehicle and the suspension means comprise fore and aft swingable supporting link means to carry and rock the bowl fore and aft as well as up and down with respect to the vehicle, said fore link means providing a bowl draft member to pull the bowl with the tractor and wherein said aft link means is shorter and more nearly vertical than said fore link means to cause the forward portion of the bowl to move vertically more than the rear portion of the bowl and to move horizontally less than the rear portion of the bowl.

5. In the combination of claim 4 wherein said raise and lower power means comprises an extensible cylinder and an intermediate arm affixed to one of said swingable link means for actuating said swingable link means in coordinated selected positions to control the loading and transporting position of said bowl.

6. In the combination of claim 1, wherein said force applying structure comprises a link extending from above the rear axle to below the rear axle and having a pivotal support intermediate its length connected with the rear of the vehicle, and wherein the force applying structure comprises an extensible cylinder connected with the upper end of the link and is mounted over the vehicle, while said ejector frame structure is disposed below said rear axle to reach rearwardly for connection with the lower end of the swinging link for ejector manipulation.

7. In the combination of claim 1 wherein said means interconnecting the bowl and the vehicle is pivotally carried at one point on said vehicle to suspend the bowl for cradle rocking about said one point and wherein said suspension means is pivotally connected to the vehicle to the rear of the rear axle for operative connection with a rearward extension on said bowl leading from the bowl under the rear axle to said suspension means.

8. In the combination set forth and defined in claim 1 wherein said power means includes a power cylinder to selectively position said bowl in any one of its positions, and wherein said force applying structure for said ejector comprises a power takeoff means of the vehicle transmission located adjacent the rear axle and a swingable arm connected with and operable from said power takeoff means, said arm having a configuration to cause its free end to move from behind the rear axle to a point under and ahead of said axle, and wherein said frame structure reaches from the ejector to said free end of the arm for connection therewith for ejector actuation by said swingable arm.

9. In the combination set forth and defined in claim 8, wherein stop means are provided in said bowl to limit the free motion of the ejector in one direction, and wherein said frame structure of said ejector is constructed with a given contour shape to engage a portion of said bowl to limit the motion of the ejector through the bowl during its other direction of movement relative to the bowl.

10. In the combination of claim 1 wherein said means interconnecting the bowl and the vehicle comprises first means mounted on the forward portion of the vehicle and reaching back to connect with the bowl to the rear of the front wheels, said suspension means comprises a rockable hanger structure depending from the vehicle to support the bowl in the space ahead of the rear wheels and between the vehicle frame and the ground, said raise and lower power means comprises extensible means connected to the vehicle and intermediate the first means of the means interconnecting the bowl and the vehicle; and said force applying structure comprises an extensible cylinder disposed beneath said rear axle and extending from behind said axle to in front of said axle.

References Cited

UNITED STATES PATENTS

| | | | |
|---|---|---|---|
| 140,271 | 6/1873 | Handy | 37—126 |
| 1,084,534 | 1/1914 | Carver | 37—126 |
| 2,515,429 | 7/1950 | Smoot | 37—126 |
| 2,517,163 | 8/1950 | Arps | 37—126 |
| 2,518,105 | 8/1950 | Werth | 37—126 |
| 2,548,461 | 4/1951 | Arps | 37—126 |
| 2,587,869 | 3/1952 | Marshall | 37—124 |
| 2,718,074 | 9/1955 | Bartlett | 37—117.5 |
| 2,852,869 | 9/1958 | Beyerstedt | 37—117.5 |
| 2,883,776 | 4/1959 | Orscheln | 37—144 XR |
| 3,138,883 | 6/1964 | Ellenburg | 37—124 |
| 3,170,254 | 2/1965 | Martin | 37—124 XR |
| 3,227,259 | 1/1966 | Howard | 197—49 |
| 3,274,711 | 9/1966 | Johnson et al. | 37—129 |
| 3,300,882 | 1/1967 | Fryer | 37—129 |
| 3,303,587 | 2/1967 | Rockwell | 37—129 XR |

EDGAR S. BURR, Primary Examiner

U.S. Cl. X.R.

37—124